United States Patent [19]
Fisher

[11] Patent Number: 5,419,381
[45] Date of Patent: May 30, 1995

[54] WOOD PELLETIZER APPARATUS AND METHOD

[76] Inventor: Gerald M. Fisher, 1491 Greenwood Ave., Palo Alto, Calif. 94301

[21] Appl. No.: 228,857

[22] Filed: Apr. 18, 1994

Related U.S. Application Data

[63] Continuation-in-part of Ser. No. 65,998, May 21, 1993, Pat. No. 5,329,977, which is a continuation-in-part of Ser. No. 895,605, Jun. 8, 1992, Pat. No. 5,215,135.

[51] Int. Cl.$^6$ ............................ B27B 1/00; B27C 9/00
[52] U.S. Cl. ..................... 144/357; 144/2 R; 144/209 R; 144/3 R; 144/213; 144/362; 144/365; 144/367
[58] Field of Search ......................... 100/121, 176, 902; 144/1 R, 2 R, 3 R, 209 R, 211, 212, 213, 329, 356, 357, 361, 362, 365, 367

[56] References Cited
U.S. PATENT DOCUMENTS

| | | | |
|---|---|---|---|
| 4,073,326 | 2/1978 | Pank et al. | 144/213 |
| 4,454,900 | 6/1984 | Hayes | 144/213 |
| 4,462,442 | 7/1984 | Pointer | 144/213 |
| 4,790,360 | 12/1988 | Clarke et al. | 144/213 |
| 5,058,639 | 10/1991 | Takagi | 144/213 |

*Primary Examiner*—W. Donald Bray

[57] ABSTRACT

A peripheral drive log lathe having no sliding surfaces susceptible to wear in either the log pinching apparatus or in the knife assembly. All loads are transferred to the frame members through rotary bearings. The knife assembly is self aligning to the thickness W of the veneer cut by the fixed distance W between the noseroll and the knife edge. The idler rolls are mounted on a carriage which can only move in parallel planes as determined by a three point translation scheme. A trio of ball screws and nuts provide synchronized drive to the three points. A rounding actuator controls the knife assembly until the log is rounded at which time the rounding actuator is de-energized and the becomes self aligning.

20 Claims, 12 Drawing Sheets

WOOD PELLETIZER APPARATUS AND METHOD

FIELD OF THE INVENTION

This invention relates to methods and apparatus for making veneers and pellets from wood.

RELATED INVENTIONS

This invention is a continuation-in-part of commonly owned U.S. patent application Ser. No. 08/065998 filed May 21, 1993, now U.S. Pat. No. 5,239,977 which is a continuation-in-part of Ser. No. 895,605, filed Jun. 8, 1992, commonly owned U.S. Pat. No. 5,215,135.

BACKGROUND OF THE INVENTION

Apparatus is described in the parent U.S. Pat. No. 5,215,135, for making fuel pellets directly from logs without requiring grinding and extruding. In this prior patent, a veneer type lathe is employed in which rolls hold the log and incise the log periphery in patterns to a depth larger than the depth of the veneer knife cut so that all three dimension of the cut off part is precisely controlled.

In the copending, commonly owned patent application 08/65998, a low cost, compact veneer cutting type device is disclosed which employs a press having three rolls for incising, holding and driving the workpiece log and means for pinching the three rolls together at the same time that the workpiece is being rotated in order to incise the workpiece prior to cutoff. In this prior '998 application, the log is peripherally driven by one of the incisor rolls. The motor for peripherally driving the log is mounted on a fixture in which the main power source moves on rails to accommodate the diminishing diameter of the log during operation. Also, in this earlier application, the upper pinch roll is mounted to a moveable carriage mounted to a piston of a cylinder for compressing the carriage into the log. Although the earlier copending '998 application is directed to a compact embodiment, it has several undesirable characteristics. It has been determined to be very difficult to design a reliable pellitizer machine in which the main power drive roll is not stationary. Because a large amount of power on the order of more than 200 HP is involved in the peripheral drive, the clearance required for the sliding motor implies vibrations which can not be eliminated and which lead to reliability problems.

SUMMARY OF THE INVENTION

It is an object of this invention to provide a rugged, rigid and reliable design of a wood lathe type device which can be used in the field or in the mill environment.

It is a further object of this invention to provide a press design which avoids any possibility of binding of the press carriage.

It is a still further object to provide an design having the main drive roll fixedly mounted to the main frame.

It is a further object of this design to eliminate linear sliding bearing and to use rotary bearings to obtain the reliability of rotary bearings.

It is an object to provide a knife linkage design which carries the knife reaction forces back through a knife linkage directly connected by large rotating bearings to the main frame to minimize the effects of moments on the structure and to avoid linear sliding surface bearings It is a further object to provide a knife cutting edge which will remain axially aligned during log rounding even in the presence of non-cylindrical logs, bumps and irregularities on the log periphery.

It is a still further object to mount the idler rolls to a vertically translatable carriage where the carriage lies in a plane and where the plane is maintained positively parallel to the axle of the drive roll by a trio of synchronously driven screws.

It is a feature of the invention that the carriage motive force is provided by a trio of screws which are controlled by a servo which is fast enough to maintain constant pressure on the log during both low speed log rounding and high speeds pelletizing.

DETAILED DESCRIPTION OF THE INVENTION

Figure 1:
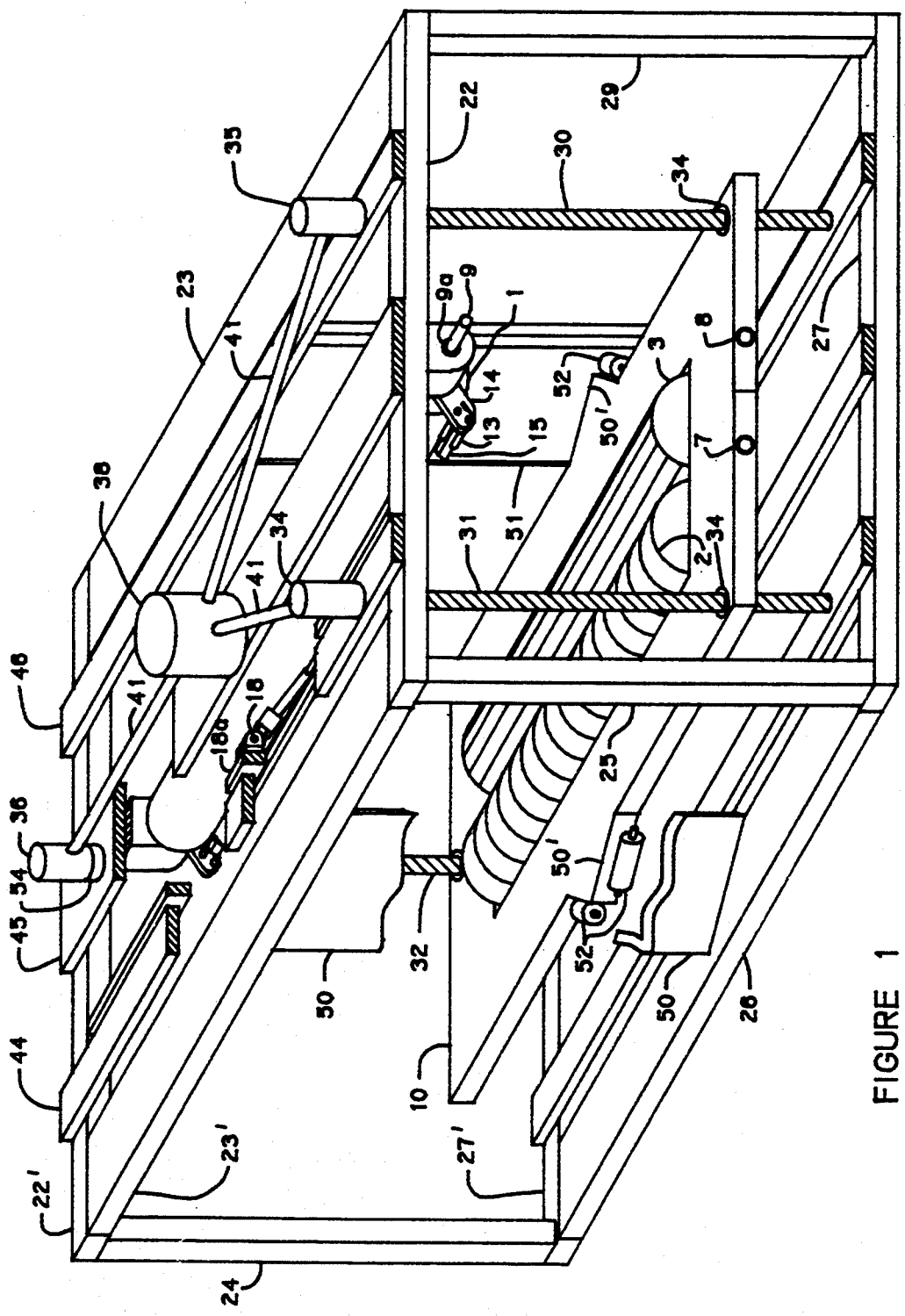
FIG. 1 is a prospective view of the preferred embodiment of the invention.

With reference to FIG. 1, a novel press structure for pinching a log between rolls is shown in which the surface of the log is incised with a pattern and in which the pattern depth is deeper than the depth of cut which is made by a veneer knife. Specifically, the workpiece log (not shown) is inserted into the area between rolls 2 and 3. Since rolls 2 and 3 are of large diameter and are under the log, they retain the log between them by gravity as it is being pinched as the carriage 10 drives upward to bring roll 1 into pressure contact with the log. The press has a main frame comprising two pairs of main frame base members 26, 26' and 27 and 27'. The main frame includes two pairs of riser supports 24, 25 and 28, 29 supporting the frame head members 22, 22' and 23, 23'. Bearing 7 and 8 are mounted to the carriage 10 and support axles of rolls 2 and 3 respectively. Bearing 9a is mounted to the head frame members 22 and 22' and support axle 9 of the drive roll 1. Roll 1 has incissors at its surface which improve the drive force as well as groove the log. One or both of the idler rolls 2,3 have crossing patterns for incising the log surface.

The carriage is moved by energizing a constant force loop including servo motor 38 which is coupled to each of three ball screw drives 35, 36 and 37 by identical ratio drives via drive shafts 41 As the ball screws 30, 31 and 32 turn in fixed ball nuts 34 mounted in carriage 10, the carriage is driven from the three points 34. Since three points define a plane, the carriage is always maintained precisely in a plane which is parallel to the drive roll 1 and knife 15. This is beneficial since many times when a log is first installed it is not round and it also does not have the same diameter over its entire length. This configuration, coupled with the constant force servo, does not place any self imposed side loadings on the carriage structural members by trying to force knife contact across its entire extent with an out-of-round log. Instead, this carriage/knife configuration permits only the log high spot region to make contact with the knife periodically and for only the high regions to be cut as the log is rotated. The knife linkage 14 is advanced incrementally closer to the log for each rotation as necessary to make up for the amount of the log diameter reduction for each turn of the log. The log is driven initially at a slower peripheral speed. When the log periphery has become round and is the same diameter across its length the peripheral drive speed is then increased.

Figure 2:
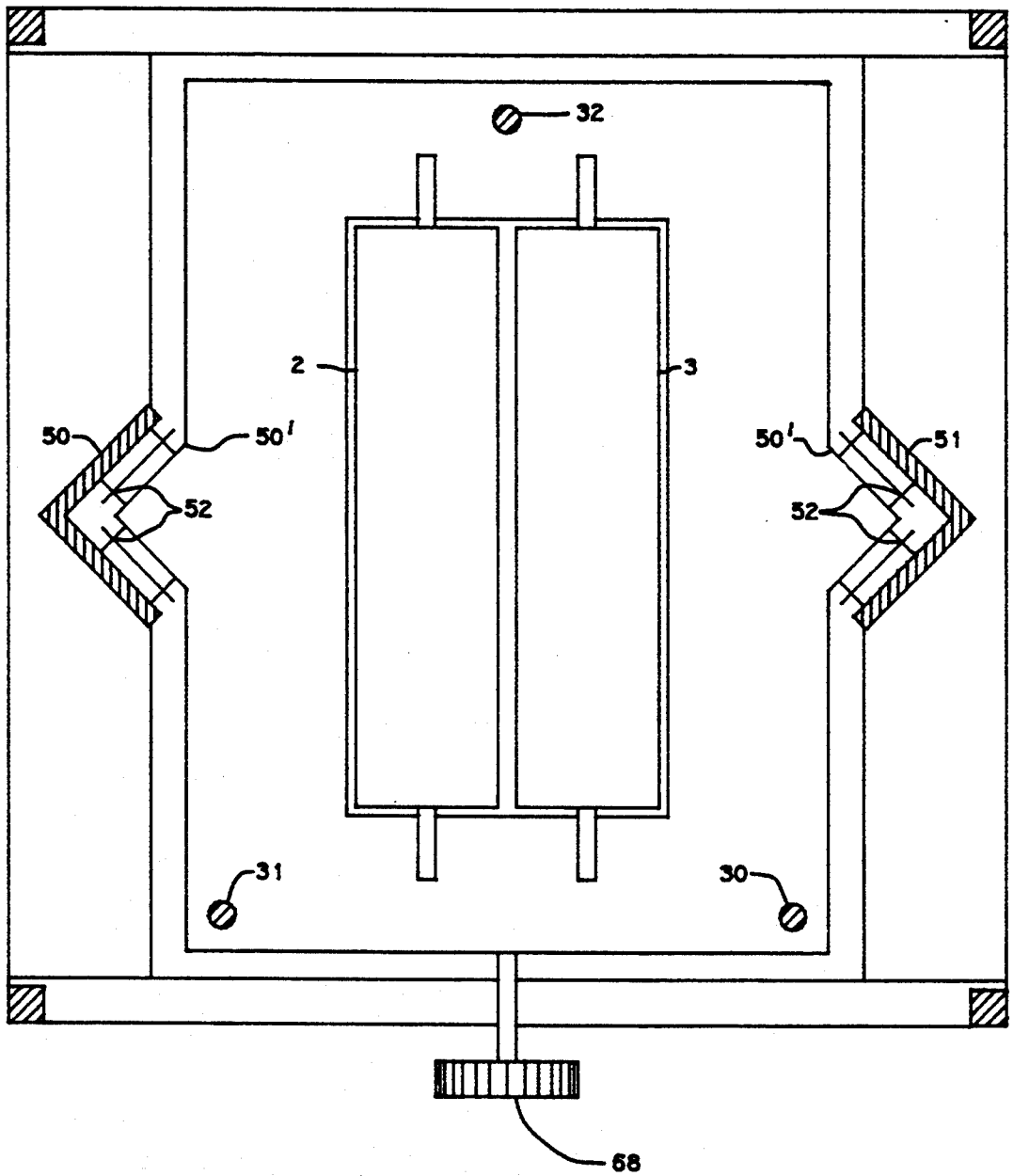
FIG. 2 is a top view of FIG. 1.

The arrangement whereby each of the ball screws engages with a ball nut which is fixed to the carriage assures that the loading of the ball screws will always be a tension loading. Ball screws can withstand very large tension loads as compared to compressive loads. Although, with this configuration, side loading on the ball screws is not expected, a pair of V guides or ways 50 and 51 (FIG. 2) are mounted to the main frame at the sides of the carriage and engage with the rollers 52 mounted to a V-shape protuberance 50' on the sides of the carriage. In FIG. 1 the V guide 50 is shown cut away to reveal the rollers on the carriage. This configuration provides essentially the same side loading constraint of having a rail at each corner of the carriage, i.e. two dimensional side loading constraint, but simplifies and avoids the difficult alignment problem during construction of aligning four rails and also avoids the problem of the carriage binding and jamming on the alignment rails during operation.

Figure 3:
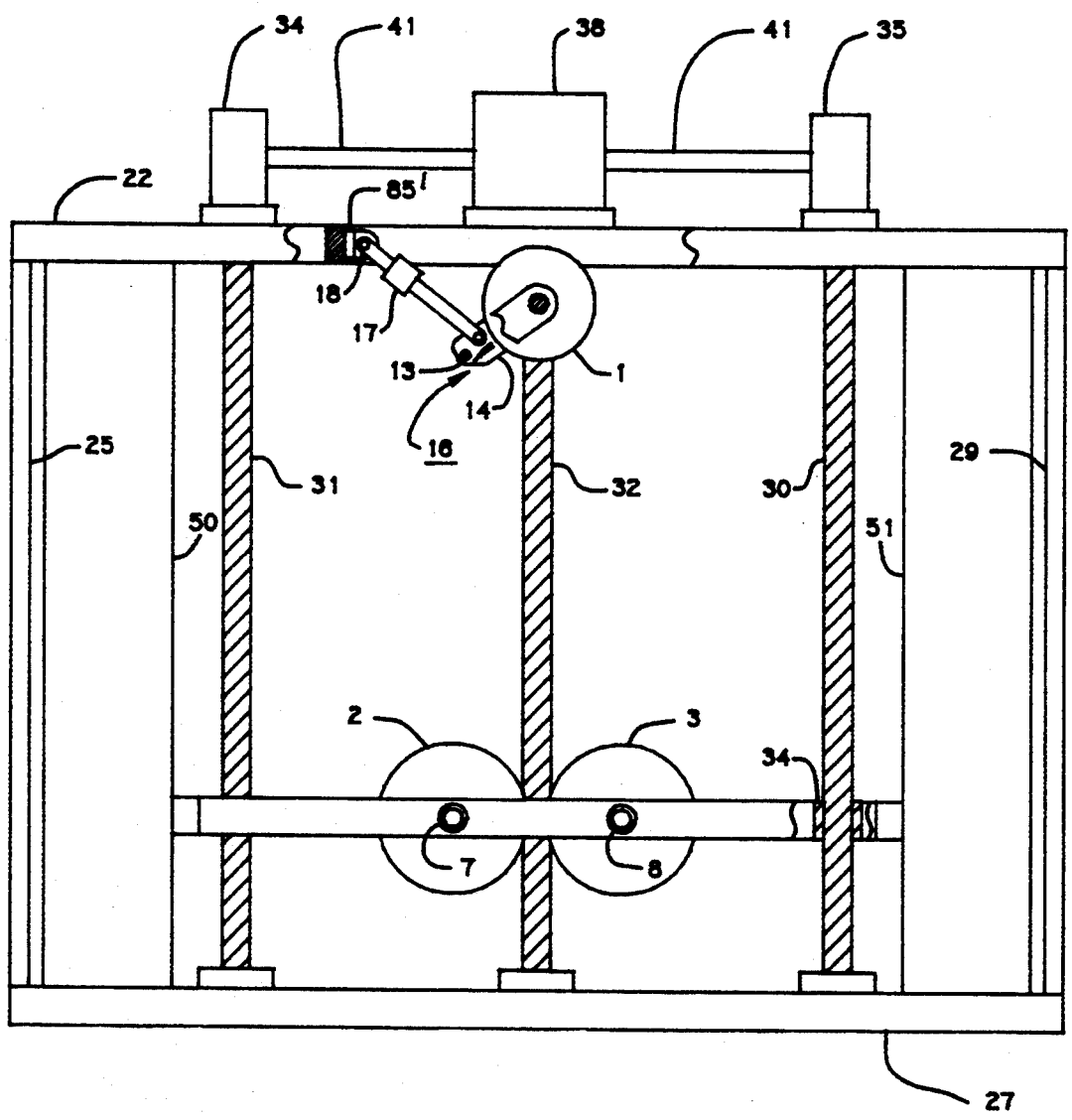
FIG. 3 is a side view of FIG. 1.
Figure 5:
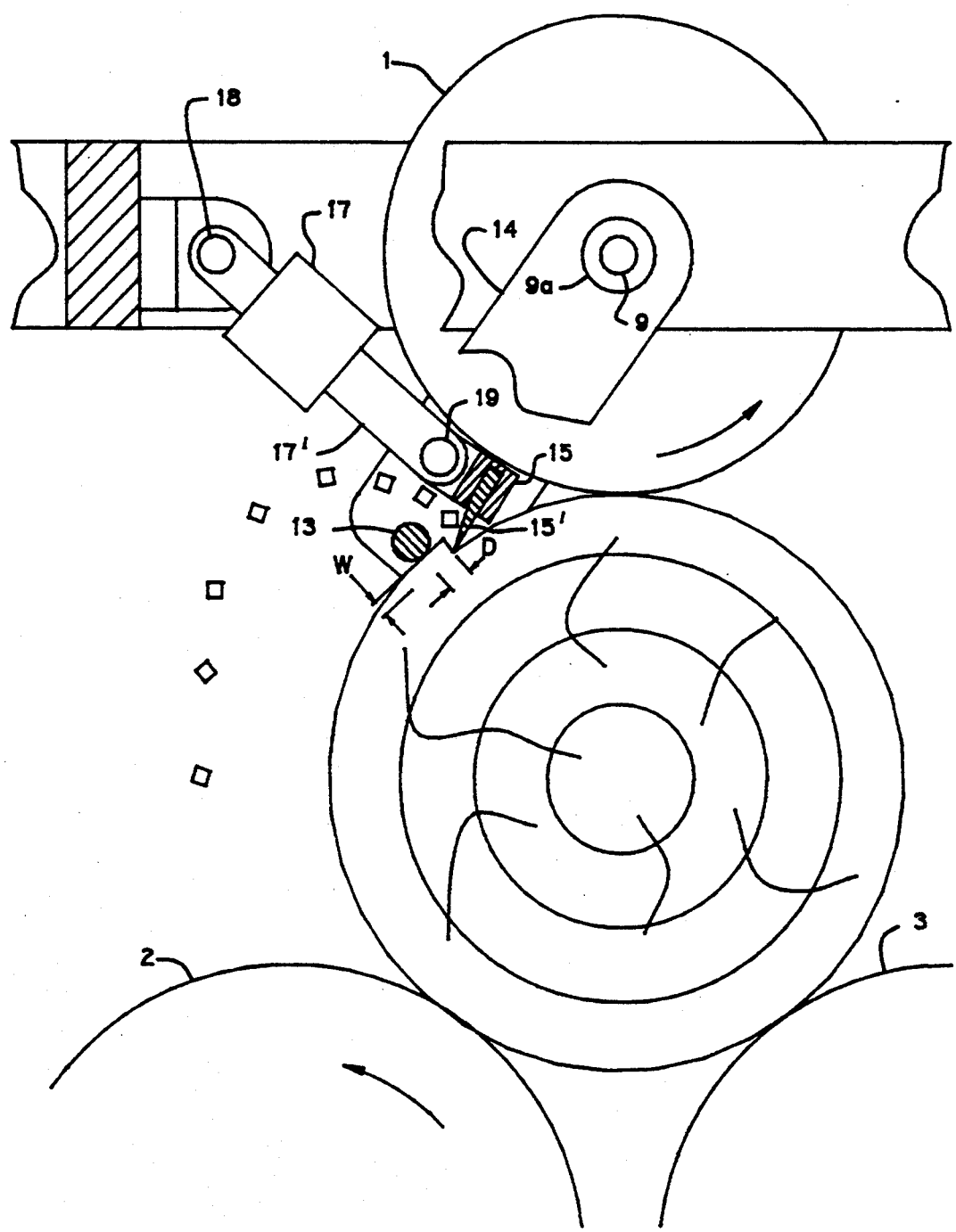
FIG. 5 is a schematic of a portion of the knife assembly in relation to the knife rounding actuator and the peripheral drive roll, workpiece and idler rolls.
Figure 7:
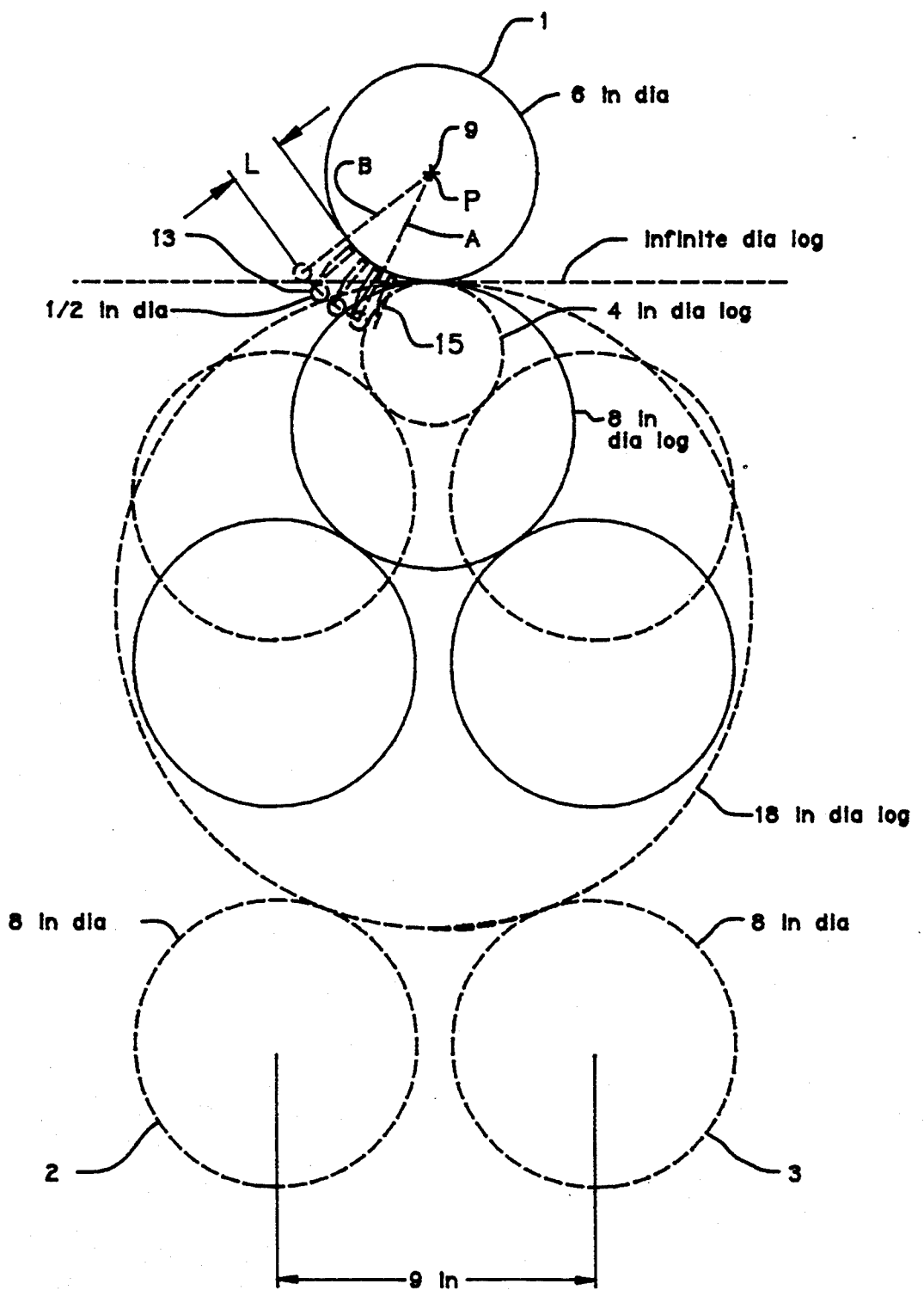
FIG. 7 is a schematic enlarged cross section showing the knife and nosebar roll for FIG. 6E in relation to a workpiece log and the drive and idler rolls for various size logs.

The control of the knife linkage is seen most clearly in FIGS. 3 and FIG. 5. The knife rounding actuator 17 is a short, completely sealed ball screw drive assembly including a motor. The actuator 17 is clevis mounted to an axle 18 which is attached to the head frame 22 and to the knife assembly 16. As seen in FIG. 5, the actuator linkage 17' is mounted by a clevis pin 19 to the knife linkage 14. The knife linkage 14 in this embodiment is directly mounted to the drive roll axle 9 by bearings 9a. With reference to FIG. 7, the relationship between the knife, and both large or small diameter logs can be more fully understood.

When a log is first inserted between rolls 1, 2 and 3, the knife assembly 16 will have been completely retracted. After the pinch force on the log is attained by moving rolls 1 and 2 upward, and the log rotation is initiated, the knife rounding actuator 17 starts to slowly and incrementally move the knife edge 15 closer to the log periphery. When the knife edge makes initial contact with the log, the knife is held firmly in position by the rounding actuator ball screw assembly 17 coupled to the axle 18 and by the pair of linkages 14 coupled to the axle 9. If the log is out-of-round, the knife contact with the log will not be continuous so that impact shocks will occur each instant when contact is re-initiated. There are usually two shocks per revolution until the log is rounded. Once the rounding has been accomplished, the rounding knife actuator 17 is de-energized and it becomes free-wheeling and because of the knife angle, the knife 15 is drawn into the log until the nosebar roll 13 makes contact with the log and acts as a knife stop as well as a nosebar anvil. The nosebar roll 13 is connected to the linkages 14 by its axle 13'. The knife cutting edge is set back from the tangent point of the nosebar by a distance D (FIG. 5) and below the contact point by a distance W(FIG. 5). In this invention, the nosebar roll serves the normal nosebar roll/anvil function of providing workpiece compression and stability at the cutting interface but in addition, the nosebar roll serves as a stop for the knife assembly and establishes the thickness W of the chip cut from the log.

In FIG. 7, the knife 15 is shown in relation to various diameter logs and to the nose bar roll 13. After the log is rounded and the knife assembly ball screw is de-energized, because of the angle of the knife, the knife assembly is drawn into the log and the nosebar 13 will then be drawn tightly against the log and acts as an anvil and as a stop. Accordingly, the space W(FIG. 5) between the nosebar roll periphery and the tip of the knife determines the thickness of the cut from the log. If the crossed embossing pattern had previously been grooved to a depth greater than this distance W, then a wood chip is formed having a thickness approximately equal to W. Depending on distance D and on the particular configuration, the thickness W is not constant and varies over the range of movement of the linkage 14. For smaller values of D, the variation in W over the range is smaller.

These knife assembly arrangements offer the advantage that when the log diameter is large and the log is not yet round, the directions of the force applied to the log by the drive roll and the force applied to the log by the knife will be close to being 180 degrees opposed. This tends to reduce a possible major source of stress on the structure since the moment is largely cancelling.

As shown on FIG. 1, mounted beneath one of the ball screw drives, i.e. 36 is a load cell 54 which senses the pinch force being exerted upon the log by the rolls. The load cell 54 is electrically connected to a visual display meter (not shown) which permits the operator to confirm that the pinch force is at the desired specified value.

Figure 9:
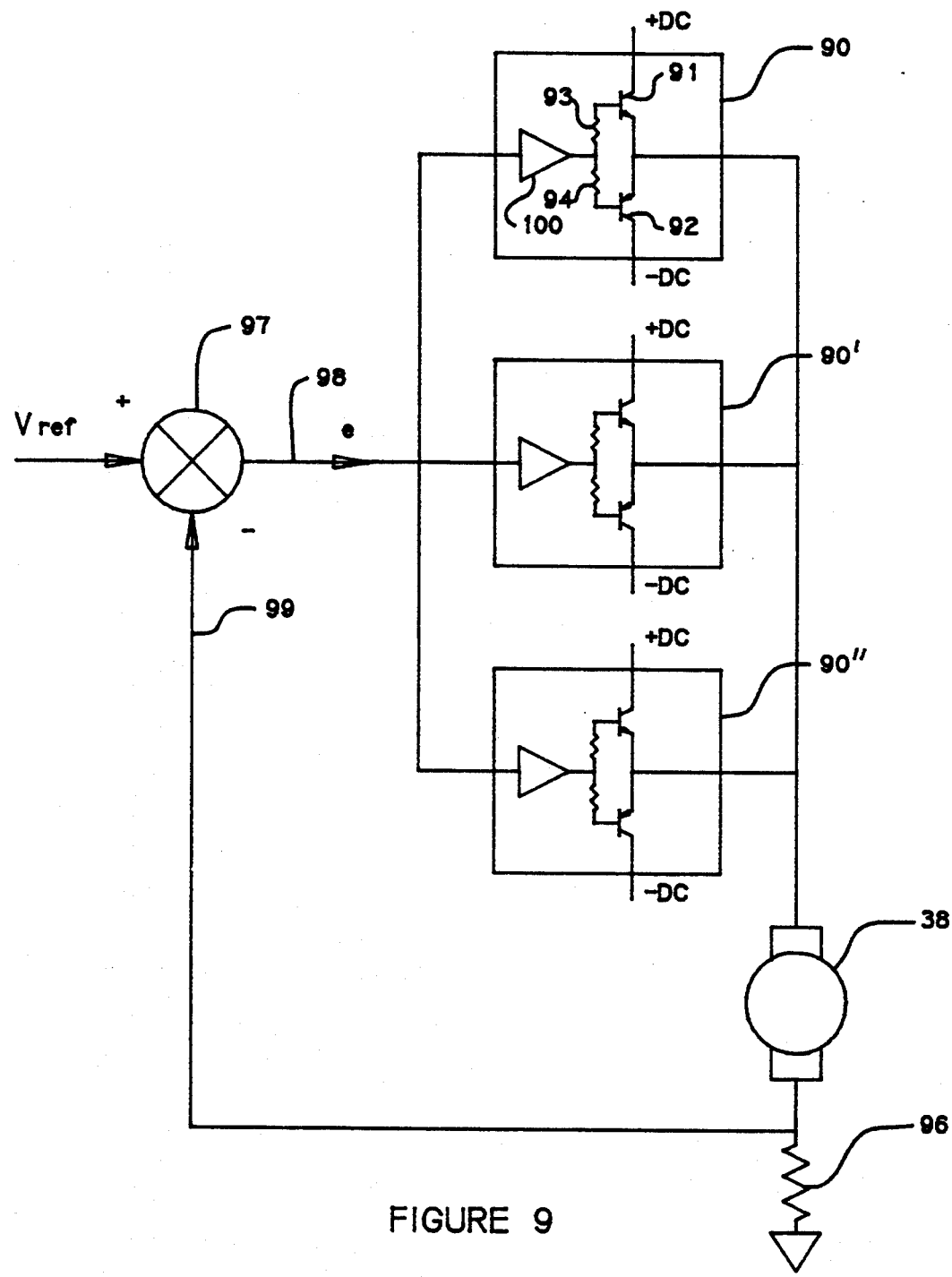
FIG. 9 is a schematic of the electrical circuit for the press carriage constant torque/force drive motor.

Preferably the motor drive circuit employs a servo amplifier circuit of FIG. 9 using a T type standard output stage having two complementary power transistors 91 and 92. The bias provided by resistors 93 and 94 needs to be carefully determined so that the two transistors are not on at the same time because that would provide a direct short between the positive and negative power supply.

Two power supplies are required by the T output stage but the circuit is simple to drive and feedback is easy to accomplish. Since the torque provided by DC motor 38 is directly proportional to its armature current, by installing a very low value resistance 96 with a high power rating in series in the armature circuit, an output voltage is provided on conductor 99 which is indicative of the torque output of the motor, i.e. the pinch force on the log. This voltage on conductor 99 is compared to a selected Vref in comparator 97 and an error 98 is developed which is sent to a linear amplifier circuit 100. The Vref is set by the operator to a value which provides the desired pinch force as indicated by the load cell 36. This circuit response time is fast enough to maintain the pinch force at a constant value while moving the carriage up and down during one revolution of the log as the log is turning even while the log is not round. The ball screw is a very efficient drive train element and this permits use of a smallish, i.e. 1 HP low mass armature motor to power the carriage pinch operation. The highest average speed operation directly relates to commercial production rate and is obviously of considerable commercial significance.

One alternative for reducing knife wear is to provide lubrication into the region of the contact between the point of the knife and the log. As more fully described in U.S. patent application Ser. No. 08/65931 filed 5/21/93, commonly owned, by inserting lubricant into the embossed incisions in the surface of the log before the veneer cut is performed, since the embossed incision is deeper than the cut, lubricant is released both above and below the line of contact between the knife and the log. Since more fluid is released and present on the top surface and since the chips are buoyant in the lubricant, the top surface of the knife will have lower friction and will abrade slower than the bottom surface. This provides an enhanced self sharpening effect.

Figure 6A:
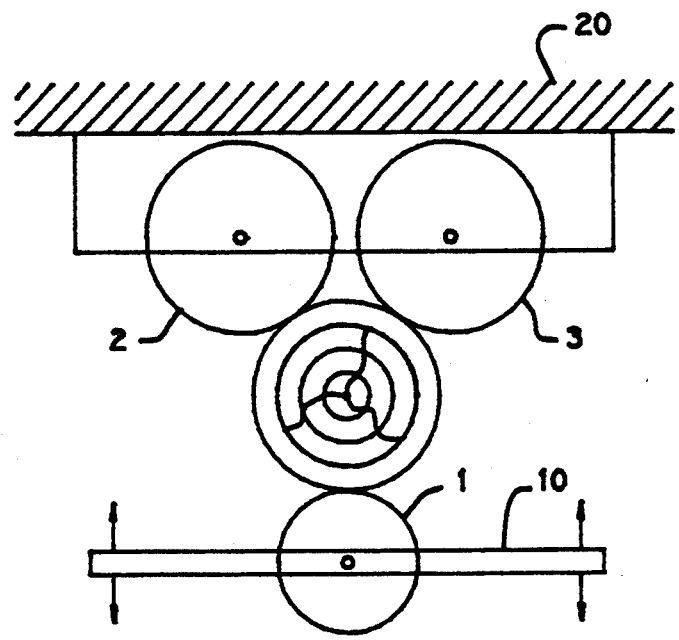
FIG. 6A, 6B, 6C, 6D, 6E, and 6F are schematics of alternative configurations of the rolls and knife assembly of the invention.
Figure 6B:
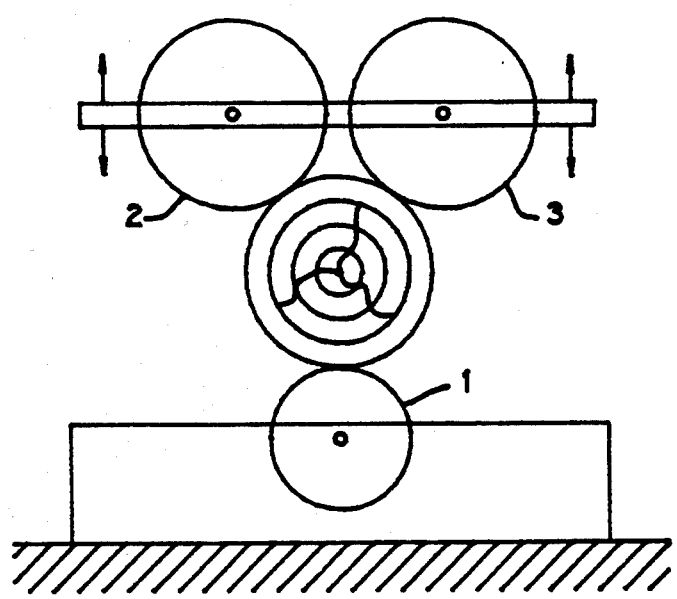

There are many alternative embodiments for carrying out the invention. For example, with reference to FIGS. 6A, 6B, 6C, 6D, 6E, and 6F, most of the various alternatives for arranging the pinch rolls knife assembly are shown. In FIG. 6A, the two idler roll axles are fixed to the frame 20 and the drive roll axle 1 moves vertically along with the carriage 10. This has several significant disadvantages. Mounting the massive drive motor or power transmission elements on a moving component is poor design practice from reliability and vibration considerations. In addition, this configuration would be more complicated to load with workpiece logs because there is no natural gravity retaining V to hold the log in place before the pinch force is applied. FIG. 6B fixes the peripheral drive motor but still has the disadvantage of no gravity retaining V to hold the log before pinching.

Figure 6C:
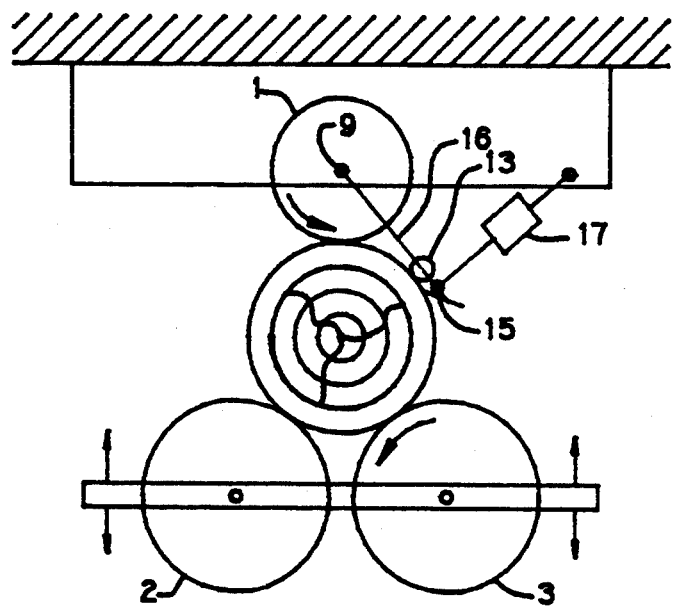
Figure 6D:
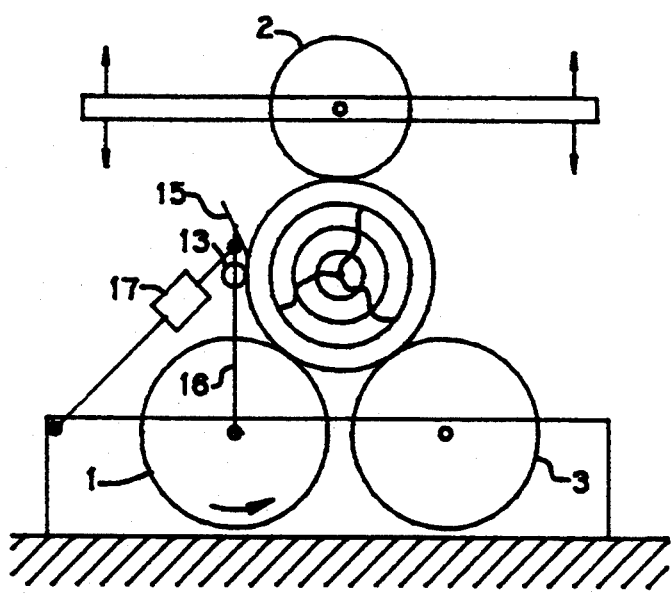

Configurations of both FIG. 6C and 6D provide the gravity V between the lower idler rolls to retain the logs as well as having fixed mounting of the main drive. Each configuration has some advantages and disadvantages with respect to another. The FIG. 6D configuration has the advantage that when the pellets are produced they can be allowed to drop down under gravity without concern about them getting between the rolls and the log because of the direction of the rotation of the drive roll 1. However, because the drive roll 1 in the FIG. 6D embodiment, is not centrally aligned, whatever moment is created when the log is not round will create imbalance. In the design of FIG. 6C, as explained earlier, the moments will be small, and since roll 1 is symmetrically located between the two rolls 2 and 3, the effect of the moment is greatly reduced. The design of FIG. 6C will need to have means to exclude the pellets from the region between the log and the idler 3 roll because roll 3 would pull the pellets into the contact region with the log because of its rotation direction. Both of these configurations place the knife 15 on the side of the noseroll 13 farthest from the drive roll axle 9 and 16 respectively. This provides more space for a large knife assembly but less space for large idler rolls. Large idler rolls are advantageous because they will provide a stable V for log retention for most realistic size logs. However, this configuration of FIG. 6C has the further disadvantage that the knife/log angle becomes too large for large diameter logs and the chip dimension W becomes markedly smaller for large diameter logs.

Figure 6E:
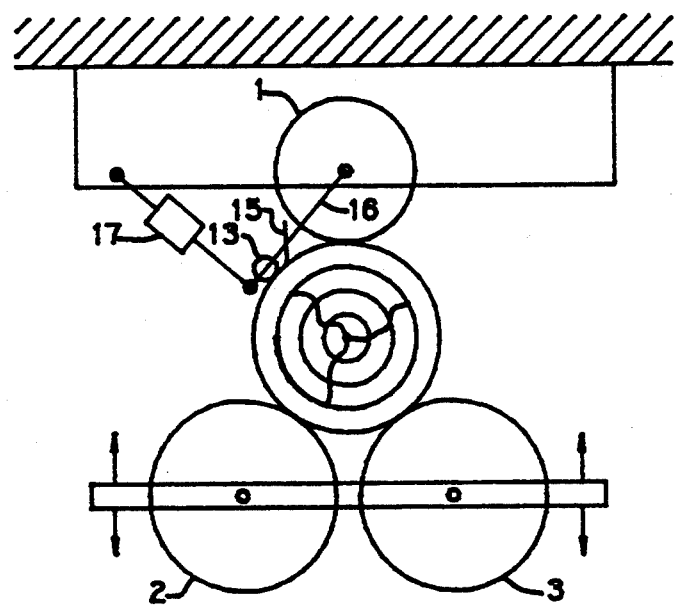

The embodiment of FIG. 6E has the knife 15 on the side of the axle of the nose roll 13 which is closest to the axle 9 and drive roll 1. This configuration retains useable low knife/log angles throughout the range of practical log diameters as well as little variation in the chip thickness over the log diameter range. This configuration does have one major disadvantage in that the permitted size L (FIG. 7) of the knife assembly which can fit into the space between drive roll 1 and a minimum size workpiece, i.e. the 4 inch log, is on the order of only 1.5 inches. This dimension may be too small to retain the required rigidity over the preferred 4 foot length of the knife assembly.

Figure 6F:
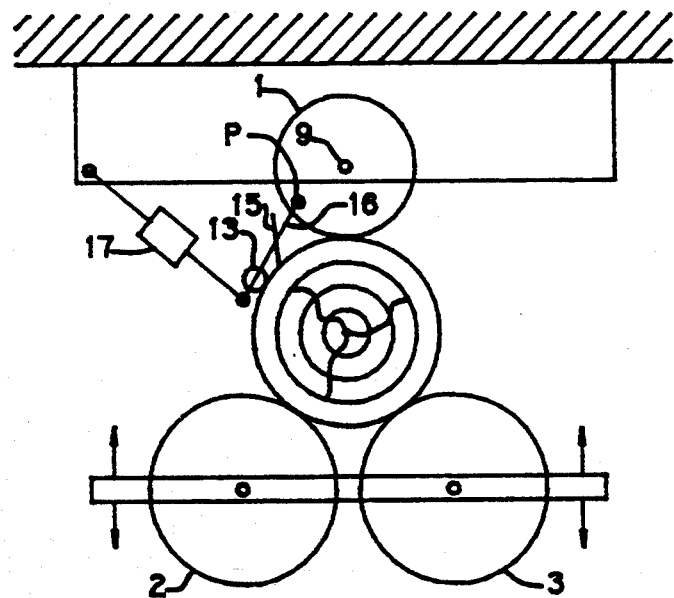
Figure 8:
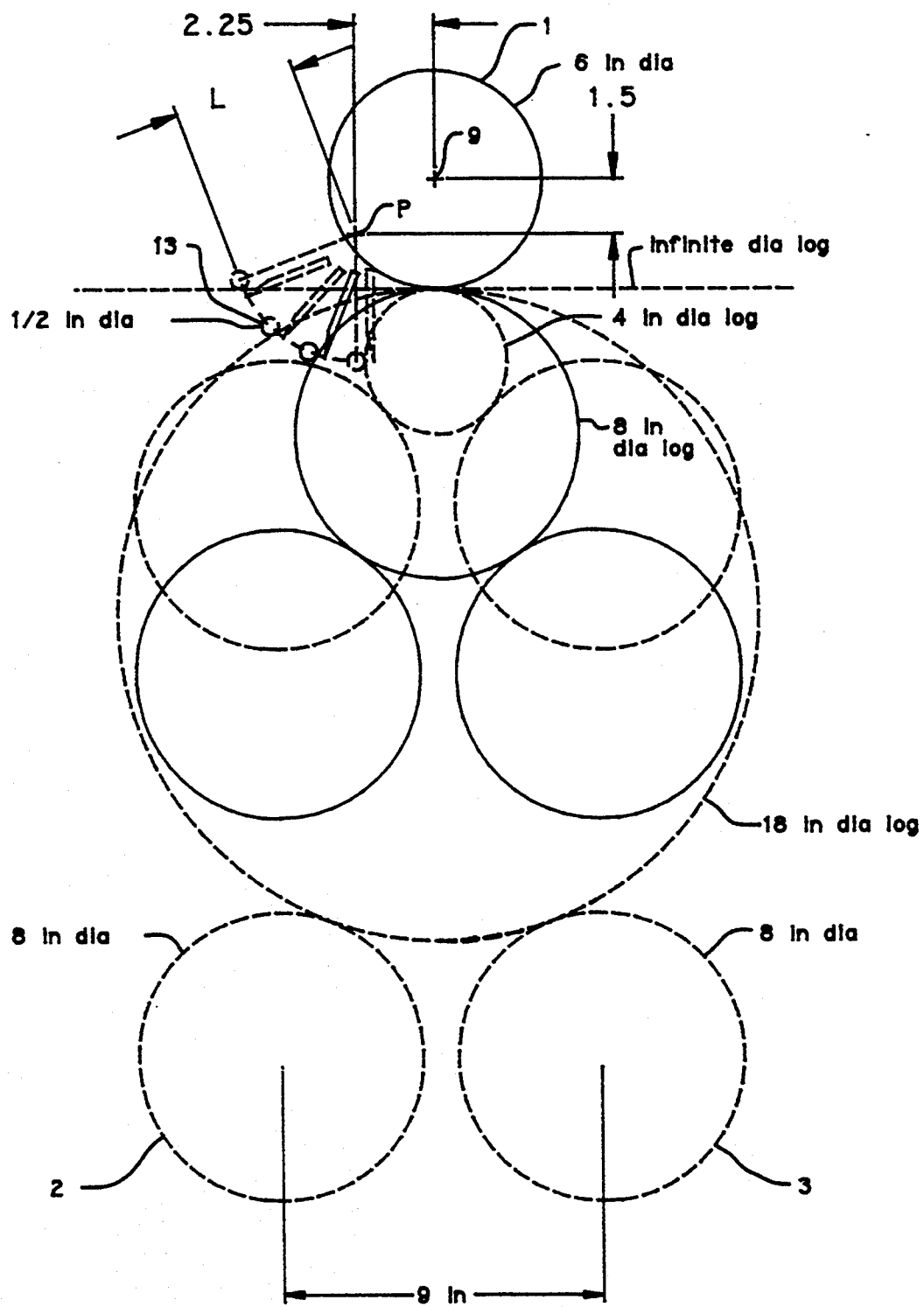
FIG. 8 is an schematic enlarged cross section similar to FIG. 7 showing the knife assembly movement for various log sizes for the alternative configuration of the embodiment of FIG. 6F having the knife assembly pivot P moved from the drive roll axle.

FIG. 6F is an alternative closely related to FIG. 6E but where the knife assembly linkage is not journalled on axle 9 but pivots about P, a different axis, which is parallel to axle 9. The advantages of the embodiment of FIG. 6F are better explained in conjunction with FIG. 8. In FIG. 8, the pivot point P for the knife assembly is moved outwardly 2.25 inches and down 1.5 inches from the drive roll axle 9. For the 4 inch diameter log, i.e. a minimum size workpiece, this pivot point configuration provides space for a deeper knife assembly, approximately L=2.7 inches. Additionally, this configuration exhibits a lower knife/log angle across its entire range of log diameters than FIG. 6E, and the chip thickness variation is less than for FIG. 6E. However, this configuration requires a sophisticated alignment scheme to align the pivot axles, point P, on the two sides of the main frame with each other and parallel to the axle 9 of the main drive roll. In a production environment for these machines, the configuration of FIG. 6F would be the preferred configuration because of its other benefits as pointed out above.

Figure 4:
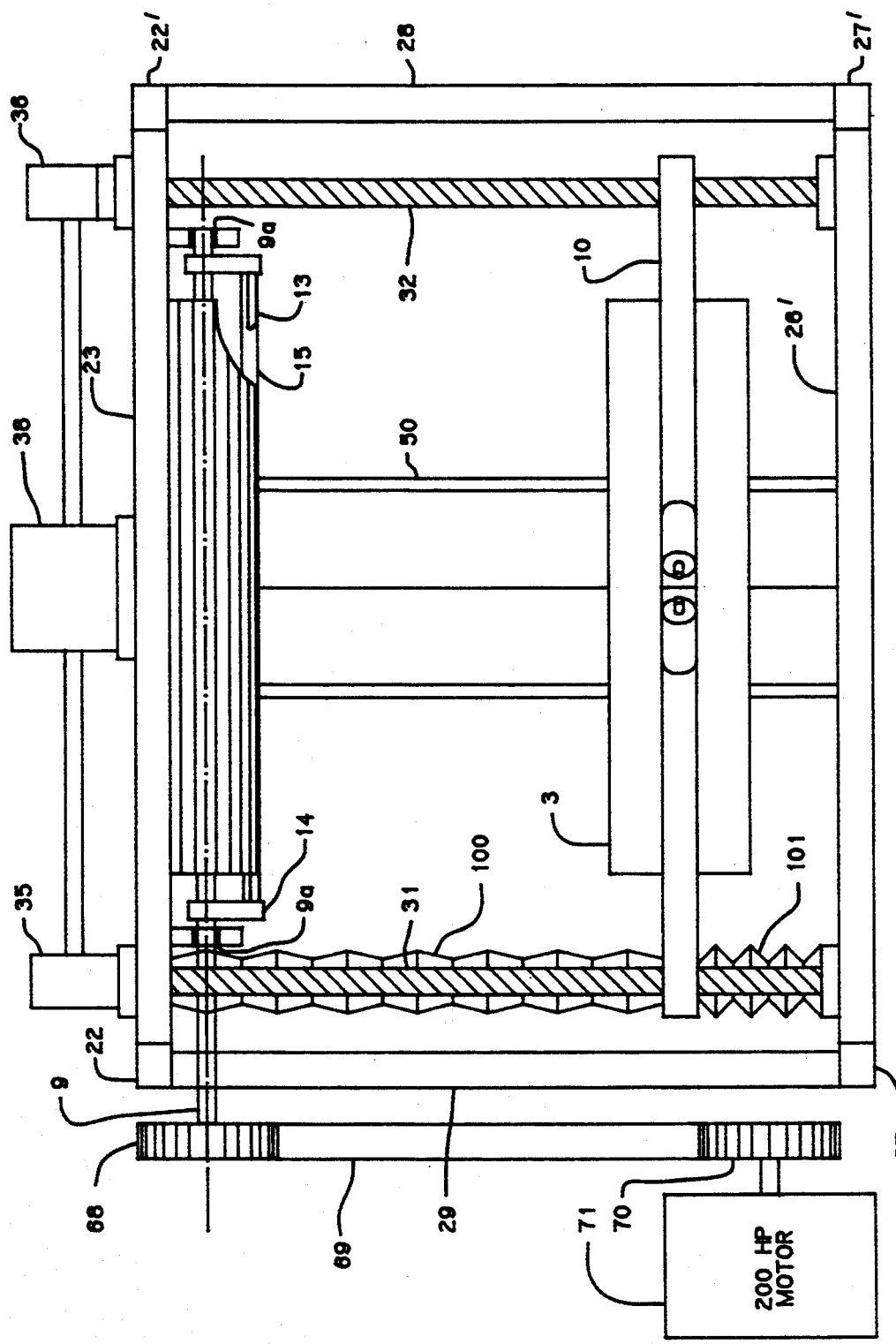
FIG. 4 is a front view of FIG. 1.

During use, the environment in and around this machine is expected to be very dusty and dirty as a result of these operations. It is appreciated that the ball screws and ball nuts must be maintained in a clean environment to obtain a long life. It is anticipated that plastic polymer boots, (FIG. 4, 100, 101) will be mounted to shroud each of the ball screws both between the upper frame and the carriage and between the lower frame and the carriage. The boots would then completely encloses the ball screws and ball nuts. Also a different type of shield (not shown) should be provided which is attached to the head frame and to the carriage and around the ways 51 and 50 to keep dirt from getting between the rollers 52 and the way contact surfaces. This cannot be an absolute seal but it is not necessary for this shield to be perfect since the rollers and ways have a loose tolerance are only to protect against excessive side movement due to extraordinary forces such as might occur if a knife were to shatter upon impact on a metal material such as a nail.

It is believed that the screw/nut carriage drive could be replaced by an hydraulic system employing three pistons/cylinders. The hydraulic system could provide the three point carriage drive with the ruggedness and environment immunity typical with hydraulic systems. However during rounding, the displacement of each of the pistons would need to be positively controlled via a feedback loop since if all the pistons of the hydraulic system were driven by a single pressure source, the carriage would attempt to follow the taper of the log and proper rounding would not be accomplished.

Figure 10:
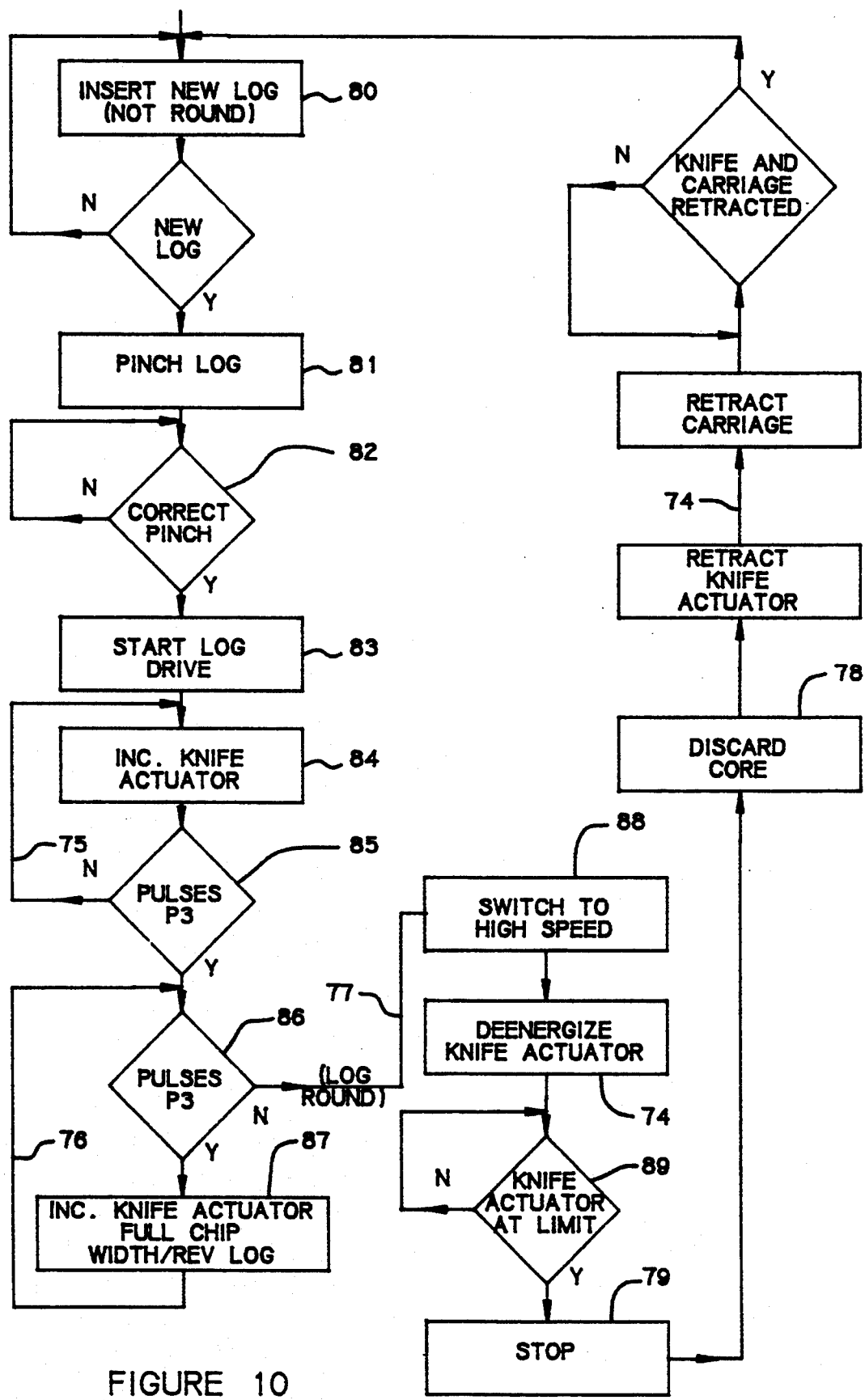
FIG. 10 is an overall operational flow diagram for the preferred embodiments of the invention.

The operation of the pellet lathe is more fully illustrated in connection with the flow diagram of FIG. 10. After a new log is installed(80), the carriage is driven toward the drive roll to pinch the log (81)and when the correct pinch force on the log is detected (82), the peripheral drive of the log is initiated (83). Since the log is not usually initially round, the knife actuator ball screw 17 which had been fully retracted is incremented toward the log (84) and the load cell 85, FIG. 5, connected under the knife actuator 17 output is monitored looking for pulses. When the pulses are detected, it means that the knife has started to have impacts with the log periphery which usually starts at one region on the log since the log is usually a tapered elliptical shape. Since the knife actuator ball screw retains the knife at a fixed distance from the center of the log for each short time increment, the log high regions are cut off by incrementally advancing the knife actuator during each log rotation 87. When the impact pulses are no longer detected, the log will have become round and a command 77 is sent to the peripheral drive to switch to high speed and the knife actuator is de-energized and allowed to freely move 74 in response to the forces on the knife. This permits the knife to be drawn into the log until the nosebar roll 13 contacts the log and restrains further radial movement of the knife. Once this occurs, the knife is cutting to the full depth W between the knife and the nosebar. When the knife actuator assembly reaches its limit, the log will have been reduced to a small diameter, and the peripheral drive will be stopped, the core removed, and the carriage and knife actuator retracted awaiting the insertion of a new log (80).

The embodiments disclosed are not intended to limit the invention and the scope of the invention should be construed in view of the claims. In particular, it is noted that the apparatus will also have application as a standard veneer lathe if the incisions made by one or more incisor roll is not deeper than the knife cut so that the embossed patterns are not separated from the peeled veneer. With this in mind,

What is claimed is:

1. A wood lathe comprising:
   a knife assembly having spaced apart rotary bearing;
   a main frame, pivot means mounted to said main frame to support said knife assembly rotary bearings;
   three parallel rolls, each said roll having an axle parallel to the axle of said other rolls, said three rolls including at least two incisor rolls, each said incisor roll providing an embossing pattern of sharp edges at its surface for making incisions in the periphery of a workpiece being pinched between said rolls, one said incisor roll also being a drive roll, and at least one of said incisor rolls being an idler roll, said drive roll axle having a journal mounted in bearings fixed to said main frame;
   carriage means, said carriage means providing rotary bearing support for the axles of said rolls other than said drive roll, said carriage means including means for translating said carriage in a direction orthogonal to said axles of said rolls to compress a workpiece between said three parallel rolls, said means for translating said carriage includes means for applying translating force to three displaced points of said carriage;
   said knife assembly including a knife having an elongated cutting edge, said knife assembly further including a nosebar roll, said nosebar roll having an axle and said nosebar roll axle being parallel to and at a fixed distance from said elongated cutting edge, said nosebar roll providing a stop for said knife assembly during operation by pressing against the periphery of a workpiece, said nosebar roll compression on said workpiece also providing cutting stability control to the workpiece by being applied to the workpiece region above said cutting edge and workpiece interface.

2. The apparatus of claim 1 wherein means for translating said carriage includes a plurality of nuts for receiving corresponding screw drive members;
   a transmission drive, each said nut having an axis, each nut being fixedly mounted to said carriage and restrained from rotation with respect to said carriage, said axis of said nuts being perpendicular to said plane containing said axes of said rolls supported by said carriage; and
   each screw drive member being mounted to screw into a corresponding said nut, each said screws being mechanically coupled to said transmission drive whereby each screw is driven synchronously by said transmission drive and provides identical amounts of translation of the carriage point to which its corresponding nut is connected in response to rotation of said transmission drive.

3. The apparatus of claim 2 wherein said plurality of nuts are ball nuts and said plurality of screws are ball screws.

4. The apparatus of claim 3 wherein said carriage further includes a pair of roller bearings attached to the carriage adjacent the periphery of said carriage;
   a V shaped way guide, said V shaped way guide having an axis, said V shaped way guide axis being aligned perpendicular to and external from said carriage, said pair of carriage roller bearings engaging with said V shaped way guide to permit translation of said carriage and to resist side loading from twisting said carriage.

5. The apparatus of claim 1 wherein said knife assembly further includes:
   a pair of knife means linkages, each said linkage having a first and second end, said pair of knife means linkages being rigidly connected to said elongated knife adjoining said first end of said knife means linkages, said pair of knife means linkages being connected to said first pair of spaced apart bearings near said second end of said linkages.

6. The apparatus of claim 5 comprising;
   a second pair of bearings, said second pair of bearings being mounted to said knife means linkages near said elongated knife;
   said nosebar roll axle being supported in said second pair of bearing, said nosebar roll being offset by a distance W from the elongated cutting edge of said knife, wherein said distance W determines the thickness of the veneer cut and wherein during operation, after the workpiece log is rounded, said nosebar roll bears against the periphery of said workpiece log.

7. The apparatus of claim 2 further comprising:
   a rounding knife actuator assembly, said rounding knife actuator assembly being connected to said knife means for adjustably controlling the distance between said elongated knife cutting edge and the periphery of said log during rounding operations.

8. The apparatus of claim 7 wherein said rounding knife actuator assembly is a ball screw assembly.

9. The apparatus of claim 2 wherein said carriage applied compression force on a workpiece is maintained by a servo loop which controls the current in a motor coupled to said transmission drive to maintain the pinching force constant at a selected value.

10. The apparatus of claim 8 wherein said actuator ball screw is advanced toward said workpiece periphery at a rate which is proportional to D/2IIR, where R is the radius of the workpiece log and D is the veneer cut depth.

11. The apparatus of claim 10 wherein said rounding knife actuator clevis pinned at one end to said knife means and clevis pinned at the other end to said main frame to rotate about an axis which is parallel to said drive roll axle.

12. A wood cutting apparatus comprising:
a main frame;
at least three parallel rolls, each said roll having an axle, said plurality of rolls including at least two incisor rolls, each said incisor roll having sharp edges at its surface for making incisions in the periphery of a workpiece placed between said rolls, a drive roll also being an incisor roll, said drive roll axle having a journal mounted in bearings fixed to said main frame;
carriage means, said carriage means for supporting at least two of said axles of said rolls and for maintaining said axles of said rolls in said parallel relationship;
a knife means, said knife means including an elongated cutting edge parallel to said axles;
said drive roll being a means for rotating a workpiece between said rolls at the same time that said workpiece is being pinched to incise the periphery of said workpiece; and
means for controlling the advance of said knife means and for maintaining said elongated cutting edge of said knife means at a controlled position with respect to the surface of said workpiece, wherein said means for controlling the advancement of said knife means includes, a pair of knife holder linkages, said knife holder linkages being adapted to be rigidly connected to said elongated cutting knife, said knife holder linkages being further supported and connected by rotary bearings to said main frame for transmitting the reaction cutting forces on said elongated knife during operation back through said linkage bearings to the main frame through the rotary bearings.

13. The apparatus of claim 12 comprising:
a nosebar roll, said nosebar roll having an axle, said nosebar roll axle being supported in bearings mounted onto said knife holder linkages, said nosebar roll being set back by a distance W from the elongated cutting edge of said knife, where said distance W is equal to the thickness of the veneer cut and wherein during operation after the workpiece log is rounded, said nosebar roll bears against the periphery of said workpiece log and serves as a stop for said knife holder linkages.

14. A method for cutting a log comprising:
pinching a log between three parallel rolls having axles;
simultaneously driving and incising the periphery of the log by providing rotary force to one of said rolls;
contacting the surface of said log with a pivotable elongated knife cutting edge, which knife cutting edge is parallel with said roll axles and is supported to pivot about an axis P parallel with said roll axles whereby said cutting edge rotates about said axis P as said cutting edge is drawn into said log by the forces applied to said cutting edge by the log as a result of rotating said pinched log; and
stopping further drawing into said log of said cutting edge by a nosebar roll which nosebar roll contacts said log upstream from the line of contact between said cutting edge and said log when the depth of the cutting edge of said elongated knife into said log equals W, said nosebar roll being fixedly coupled to said elongated knife cutting edge at said selected distance W.

15. The method for cutting a log comprising:
(a) pinching a log between three parallel rolls having axles;
(b) driving the periphery of said log by providing rotary force to at least one of said rolls;
(c) compressing against the surface of said log with a pivotable elongated cutting edge, said elongated cutting edge being parallel to said axles and supported to pivot about an axis P, said axis P being parallel to said roll axles;
(d) sensing if said log is round and if said log is not round then proceeding to step (e) but if said log is round then jumping to step (f);
(e) retaining said elongated cutting edge at a first position for one rotation of said log as determined by controlling with a knife rounding actuator the rotation angle of said cutting edge about said pivot point P, and sensing if the log is round, and if said log is round proceeding to step (f) and if said log is not round then incrementing said knife rounding actuator and repeating step (e);
(f) de-energize said knife rounding actuator so that said elongated knife assembly will be drawn into said log without further restraint by said knife rounding actuator.

16. A wood cutting apparatus comprising:
a frame;
a trio of rolls for pinching a log therebetween and for driving said log by peripherally applying force to said log by one or more of said rolls, the axes of said rolls being parallel;
means for supporting said trio of rolls by said frame;
a elongated knife assembly including a pair of linkages, an elongated cutting edge and an nosebar roll, said nosebar roll having an axle mounted by bearings to said pair of linkages, said linkages being mounted to said frame so that said nosebar roll axis is parallel to said roll axes and to said elongated cutting edge and whereby said nosebar roll axis is fixed in spatial relationship relative to said elongated cutting edge; and
means for supporting said elongated knife assembly by said frame.

17. The apparatus of claim 16 wherein said means for supporting said elongated knife assembly by said frame comprises:
a first pair of bearings, said first pair of bearings being mounted in said linkages, said first pair of bearings being mounted to shaft means supported by said frame to rotate about a pivot axis P.

18. The apparatus of claim 17 wherein said pivot axis P is coincident with the axis of said drive roll.

19. The apparatus of claim 17 wherein the pivot axis P is displaced from but parallel to the axis of said drive roll.

20. The apparatus of claim 19 wherein the pivot axis is displaced to a position closer to the contact point between said drive roll and said log than the axis of said drive roll.

* * * * *